(No Model.)

J. C. BAYLES.
PIPE COUPLING.

No. 424,951. Patented Apr. 8, 1890.

Attest:
L. Lee.
F. C. Fischer.

Inventor:
James C. Bayles, per
Crane & Miller, Attys.

UNITED STATES PATENT OFFICE.

JAMES C. BAYLES, OF EAST ORANGE, NEW JERSEY.

PIPE-COUPLING.

SPECIFICATION forming part of Letters Patent No. 424,951, dated April 8, 1890.

Application filed October 9, 1889. Serial No. 326,397. (No model.)

*To all whom it may concern:*

Be it known that I, JAMES C. BAYLES, a citizen of the United States, residing at East Orange, Essex County, New Jersey, have invented certain new and useful Improvements in Pipe-Couplings, fully described and represented in the following specification and the accompanying drawings, forming a part of the same.

This invention relates to an improved method of securing coupling-castings upon the ends of malleable sheet-metal pipes, and is illustrated herein in connection with hub and spigot castings. Such pipes are now made by means of various welded and riveted seams of much thinner material than heretofore; and the object of the present invention is to facilitate the coupling of such pipes together by a calked-lead joint.

To practice my improvement, the hubs and spigots are made of cast-iron separate from the pipe, with suitable seats upon which the ends of the pipe may be flanged over, and are provided each with annular recesses at their opposite ends into which lead may be cast; and the invention consists, first, in forming the hub and spigot castings each with annular recesses at their opposite ends and with an annular seat adjacent to the outer recess; secondly, in applying such castings to the pipe at a suitable distance from the ends to permit the bending of flanges thereon; thirdly, fitting the lead within the recesses around the pipe; fourthly, calking the lead within such recesses, and, fifthly, flanging over the end of the pipe upon the seat on the casting.

It also consists in the article to be thus used.

Figure 1:
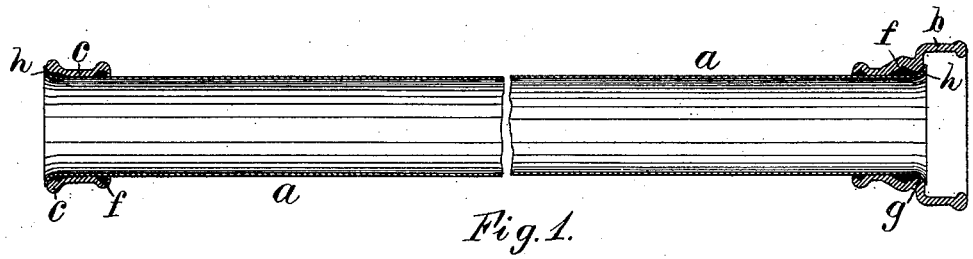
Figure 2:
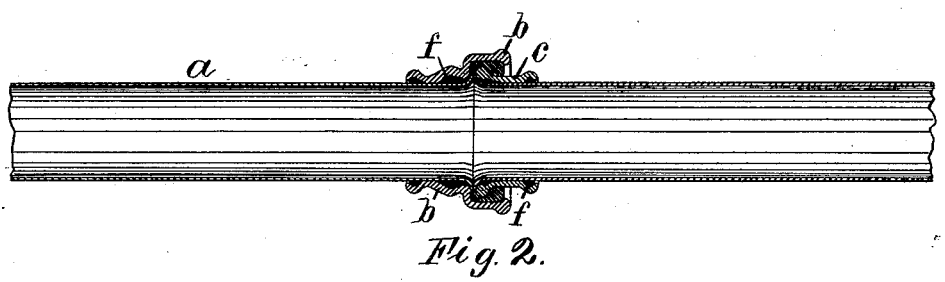
Figure 3:
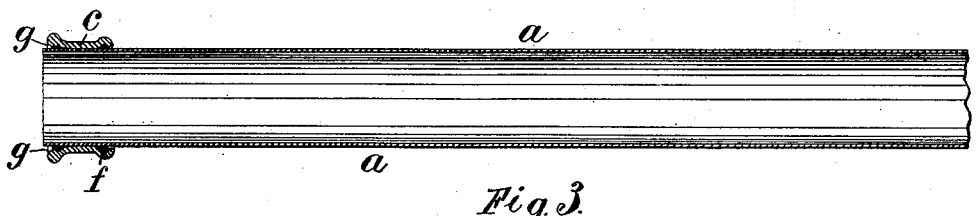
Figure 4:
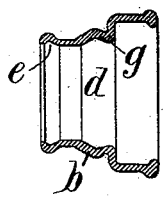
Figure 5:
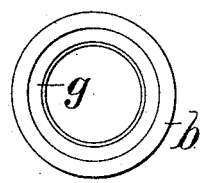
Figure 6:
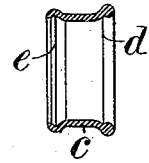
Figure 7:
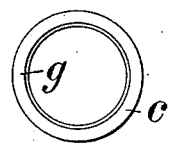

In the annexed drawings, Figure 1 represents in longitudinal section a length of pipe broken in the middle for want of room with a hub and spigot secured upon its opposite ends. Fig. 2 is a section of the hub and spigot with two pipe ends united thereby. Fig. 3 represents in section the spigot secured to the end of the pipe before the latter is flanged over. Fig. 4 is a side view, and Fig. 5 an end view, of the hub detached from the pipe, and Figs. 6 and 7 are similar views of the spigot.

*a* is a pipe; *b*, the hub; *c*, the spigot; *d*, the annular recess at the inner end of the hub and spigot; *e*, the annular recess at the rear or outer end of the hub and spigot, and *f* the lead inserted in the same.

*g* is a seat formed upon the outer end of the spigot, and *g'* an analogous seat formed in the bottom of the socket within the hub, which seats are adapted to form a curved flange upon the end of the pipe when the latter is bent over in contact with the same, as at *h* in Fig. 1.

The hub and spigot are cast of suitable size intermediate to the recesses *d* and *e* to fit approximately to the outside of the pipe to center the casting thereon, and the recesses *d* and *e* are formed of suitable shape to lock the lead therein when calked in the usual manner.

In securing the hub and spigot upon the pipe by my method the casting is slipped upon the pipe with the end projecting from the seat *g* or *g'* a suitable distance, as shown in Fig. 3, to flange over the end of the pipe against such seat, as shown in Fig. 1, and the lead is then inserted in the annular recesses *d* and *e* and calked therein. To form the desired joint, an annular strip of cold lead may be inserted in the recess and calked therein, or melted lead may be poured in the recesses, as is common in making lead joints with hub and spigot couplings. When fitted within the recesses, the lead is calked by suitable tools applied from the exterior of each recess, and the end of the pipe is then swaged over upon the seat formed on the casting to form the annular flange *h*. The annular flange formed in this manner performs several functions—as, first, it jams the sheet metal which is bent at the inner corner of the flange into close contact with the calked lead and thus secures a more perfect joint; secondly, it forms a projecting ring upon the end of the pipe in contact with the cast-metal seat upon the fitting and thus makes the union of the fitting with the pipe more rigid; thirdly, it affords a transverse seat upon the end of the pipe, which is better adapted to join and press against the opposed pipe end than the thin sheet metal before flanging, and, fourthly, such seat affords the means of inserting an intermediate packing between the pipe ends, as shown in Fig. 3.

It will be readily seen that if the opposite ends of a pipe were first flanged over the hub and spigot castings could not be applied thereto, and if such castings were first applied and the flanges then formed before the castings were secured upon the pipe by the lead joints the sheet-metal flange would prevent the calking of the lead at the joint adjacent to the seats $g$ and $g'$. As such joints are nearest to the interior of the pipe, it is most essential that they should be made tight, and the calking of such joints can only be practiced by first applying the castings to the pipe adjacent to the end, then calking the lead joints, and finally flanging the sheet metal, as shown in Figs. 1 and 3.

I am aware that it is not new to secure hub and spigot castings upon straight pipes by lead joints, and I do not therefore claim the same broadly; but, Having shown that my invention requires a certain method of procedure to produce the desired results, what I claim is—

1. The method of securing coupling-castings upon thin sheet-metal pipes, which consists, first, in forming the hub and spigot castings each with annular recesses at their opposite ends and with an annular seat adjacent to the outer recess; secondly, in applying such castings to the pipe at a suitable distance from the ends to permit the bending of flanges thereon; thirdly, fitting the lead within the recesses around the pipe; fourthly, calking the lead within such recesses, and, fifthly, flanging over the end of the pipe upon the seat on the casting.

2. The pipe-coupling consisting in the hub $b$ and spigot $c$, formed each with the recesses $d$ and $e$ and with the seats $g$ and $g'$ adjacent to the recess $d$, substantially as herein set forth.

In testimony whereof I have hereunto set my hand in the presence of two subscribing witnesses.

JAMES C. BAYLES.

Witnesses:
 L. LEE,
 H. J. MILLER.

Correction in Letters Patent No. 424,951.

It is hereby certified that in Letters Patent No. 424,951, granted April 8, 1890, upon the application of James C. Bayles, of East Orange, New Jersey, for an improvement in "Pipe-Couplings," an error appears in the printed specification requiring correction as follows: In line 23, page 2, the words "hub and spigot," should read *coupling;* and that the said Letters Patent should be read with this correction therein that the same may conform to the record of the case in the Patent Office.

Signed, countersigned, and sealed this 29th day of April, A. D. 1890.

[SEAL.]
               CYRUS BUSSEY,
              *Assistant Secretary of the Interior.*

Countersigned:
 ROBERT J. FISHER,
  *Acting Commissioner of Patents.*